US007715983B2

(12) United States Patent
Barrus et al.

(10) Patent No.: US 7,715,983 B2
(45) Date of Patent: May 11, 2010

(54) DETECTING HAZARDOUS CONDITIONS IN UNDERGROUND ENVIRONMENTS

(75) Inventors: William G. Barrus, Cary, NC (US); John L. Ferenczi, Charlotte, NC (US)

(73) Assignee: International Business Machines Corporation, Armonk, NY (US)

(*) Notice: Subject to any disclaimer, the term of this patent is extended or adjusted under 35 U.S.C. 154(b) by 94 days.

(21) Appl. No.: 11/564,975

(22) Filed: Nov. 30, 2006

(65) Prior Publication Data

US 2008/0129525 A1 Jun. 5, 2008

(51) Int. Cl.
*G01V 3/38* (2006.01)

(52) U.S. Cl. .......... 702/2

(58) Field of Classification Search .......... 702/2
See application file for complete search history.

(56) References Cited

U.S. PATENT DOCUMENTS 3,944,996 A 3/1976 McCarter et al.
3,949,353 A 4/1976 Waters et al.
4,136,556 A 1/1979 Graham
4,318,302 A 3/1982 Choi
4,495,496 A 1/1985 Miller, III
6,215,410 B1 4/2001 Singer et al.
6,339,709 B1 1/2002 Gladwin et al.
6,512,478 B1 1/2003 Chien
6,859,831 B1 2/2005 Gelvin et al.
7,020,701 B1 3/2006 Gelvin et al.
2002/0098868 A1 7/2002 Meiksin et al.
2003/0137421 A1 7/2003 Herkenrath et al.
2004/0128091 A1 7/2004 Delin et al.
2004/0174269 A1 9/2004 Miller et al.
2005/0088299 A1 4/2005 Bandy et al.
2005/0192727 A1 9/2005 Shostak et al.
2006/0066449 A1* 3/2006 Johnson .......... 340/539.12
2007/0040655 A1* 2/2007 Lee et al. .......... 340/10.1
2007/0263560 A1* 11/2007 Saarisalo et al. .......... 370/328
2008/0074254 A1* 3/2008 Townsend et al. ...... 340/539.11

* cited by examiner

*Primary Examiner*—Bryan Bui
*Assistant Examiner*—Jonathan Teixeira Moffat
(74) *Attorney, Agent, or Firm*—Cuenot, Forsythe & Kim, LLC

(57) ABSTRACT

A method of detecting hazardous conditions within an underground environment can include obtaining acceleration information at a plurality of communication nodes distributed throughout the underground environment and propagating the acceleration information among selected ones of the plurality of communication nodes to an analysis node. An indication of a hazardous condition within the underground environment can be identified from the acceleration information collected over a period of time. If an indicator is identified, a notification of the hazardous condition can be provided.

16 Claims, 2 Drawing Sheets

DETECTING HAZARDOUS CONDITIONS IN UNDERGROUND ENVIRONMENTS

BACKGROUND OF THE INVENTION

Working in underground environments such as tunnels or other underground excavations can be dangerous. Underground environments are associated with a special set of potentially life threatening conditions that include cave-ins, collapsing tunnel structure, exposure to toxic gases, and the like. As such, prevention and detection of these conditions are of paramount concern.

An underground environment, however, poses special challenges that must be addressed to successfully detect and prevent hazardous conditions. Technologies that function well above the ground, such as Global Positioning System (GPS), mobile phones, visual observation, and the like, do not function well below ground. This makes it difficult to assess a potentially dangerous situation in the underground environment.

SUMMARY OF THE INVENTION

The present invention relates to methods, systems, and computer-readable storage media for detecting hazardous conditions within an underground environment. In general, embodiments of the invention can include obtaining acceleration information via an accelerometer within each of a plurality of communication nodes distributed throughout the underground environment and propagating the acceleration information among selected ones of the plurality of communication nodes to an analysis node. An indication of a seismic activity within the underground environment can be identified from the acceleration information. If an indication is identified, a notification can be provided of a hazardous condition.

DETAILED DESCRIPTION OF THE INVENTION

Figure 1:
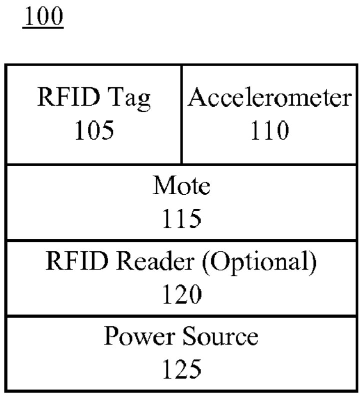
FIG. 1 is a block diagram illustrating a communication node in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. The medium can be, for example, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk—read only memory (CD-ROM), a compact disk —read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wire-line, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The computer program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing computer program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to detecting and preventing hazardous conditions within an underground environment. In accordance with the embodiments disclosed herein, various devices can be distributed throughout an underground environment. These devices can be outfitted with a variety of different sensors. The devices can communicate with one another to form a self-organized, wireless network through which the data collected by the sensors on the respective devices can be propagated. Data propagated through the wireless network can be provided to an analysis module which can analyze the received data. The analysis can be performed over a time period, whether minutes, days, weeks, months, etc., to identify hazardous conditions that may have occurred as well as predict the occurrence of hazardous conditions in the future with respect to the underground environment.

In addition to predicting and detecting hazardous conditions, the present invention can perform functions relating to identifying the location of a hazardous condition that has occurred as well as track movements of personnel in the underground environment. Accordingly, location information for the personnel can be provided or estimated for time periods leading up to, during, and after the occurrence of a hazardous condition. Other features of the present invention disclosed herein will be discussed with reference to the figures below.

FIG. 1 is a block diagram illustrating a communication node 100 in accordance with one embodiment of the present invention. The communication node 100 can be included as part of a wireless network that can be distributed throughout an underground environment as will be discussed herein in further detail. The communication node 100 can be configured to identify information that can be used to detect a hazardous condition within an underground environment. A hazardous condition can include, but is not limited to, a cave-in, a tunnel collapse, or any other event that may pose a danger or threat to human safety. An underground environment can refer to a cave, a tunnel, an excavation, an underground structure, or any other below ground cavity, whether naturally occurring or man-made.

As shown, the communication node 100 can include a radio frequency identification (RFID) tag 105, an accelerometer 110, a mote 115, an optional RFID reader 120, and a power source 125. In one embodiment, the RFID tag 105 can be an active tag that is powered from the power source 125, e.g., a battery. The RFID tag 105 can emit an RF signal that can be detected by an RFID reader, such as RFID reader 120 if included. In another embodiment, the RFID tag 105 can be a passive device that can be interrogated by an RF field emitted by the RFID reader 120. When interrogated, the RFID tag 105 can become active. That is, the RFID tag 105 can detect the presence of the field emitted by the RFID reader 120 and subsequently activate to send data. A passive RFID tag can communicate with the RFID reader 120 via wireless RF communication links that are not limited to line of sight operation.

Regardless of the particular type of RFID tag used, the RFID tag 105 can send a unique identifier or transmit on a unique frequency (collectively referred to as a "tag ID") which allows the RFID tag 105 to be uniquely identified. Other objects, such as the particular communication node within which RFID tag 105 is disposed, people, or equipment, can be logically related to the tag ID such that when RFID tag 105 is read, any associated objects can be identified.

The accelerometer 110 can detect changes in acceleration of objects to which the accelerometer 110 is attached. Accordingly, when included in the communication node 100 and disposed within an underground environment, the accelerometer 110 can detect vibrations, seismic activity, or other disturbances within the underground environment. Information generated by the accelerometer 110 can be collected within the communication node 100.

In one embodiment, the accelerometer 110 can be implemented within the communication node 110 with the RFID tag 105 such that when the accelerometer 110 detects a disturbance, the current moving into or out of the accelerometer 110 can be used to charge the RFID tag 105. This current can provide sufficient charging for the RFID tag 105 such that the RFID tag 105 can discharge or emit a signal in response to activation of the accelerometer 110.

The mote 115 can include a wireless transceiver that includes embedded networking and routing programming which allows the mote 115 to form ad-hoc, wireless networks with other motes, or communication nodes as the case may be. Accordingly, a plurality of communication nodes equipped with motes, such as mote 115, can form a self-organized, wireless network. The mote 115 can operate from the power source 125 and be configured to conserve battery life such that the mote 115 can be set to enter a sleep mode and awake when a sensor, such as the RFID reader 120 or the accelerometer 110 provides data to the mote 115 for transmission.

In one embodiment, the mote 115 can be implemented as a small, low power device. In that case, the mote 115 can communicate with the other components of the communication node 100 via an internal communication bus (not shown). In another embodiment, the mote 115 can be implemented as a larger mote, which sometimes is referred to as a "macro mote". In that case, the mote 115 can include a plurality of input/output (I/O) ports through which various peripheral devices, or sensors, can be linked. In still another embodiment, the communication node 100 can include a bus structure, to be described herein in further detail, which facilitates the addition of further sensors. The bus structure can link the peripheral device and the communication node both structurally and communicatively.

In any case, the mote 115, can receive any information collected by a sensor such as the accelerometer 110 or the optional RFID reader 120. The information can be collected by the mote via the bus and/or the I/O ports. The mote 115, being equipped for wireless communication, can wirelessly transmit such data to other communication nodes that may be in range as well as receive such information from other communication nodes within range for re-broadcasting to still other communication nodes or an analysis module as the case may be.

The mote 115 can be programmed with a unique identifier that can be included in any communication or transmission sent from the communication node 100 such that any data originating from the communication node 100 that is received by any other communication node within the network can be identified as having originated at communication node 100 or mote 115.

The inclusion of the optional RFID reader 120 can provide several additional functions. In one aspect, the RFID reader 120, powered by power source 125, can provide increased capability in terms of communication node identification. For example, the RFID reader 120 can be used to read the tag ID of the RFID tag 105 within the same device, i.e., communication node 100. The tag ID can be included in transmissions from the communication node 100 as an identifier of the communication node 100 that exists in conjunction with, and independently of, the identifier included in the transmission by the mote 115.

In this regard, the presence of the tag ID within the transmission provides redundancy and increased accuracy as the identity of the communication node 100 having sent the transmission is specified in two different formats and locations within the transmission. The inclusion of the tag ID within transmissions from the communication node 100 further provides a form of identification for the communication node 100 that typically is more accessible than the identifier sometimes provided by the mote 115. Additionally, the tag ID provided by a given communication node can be changed easily by switching the RFID tag on the communication node with another and creating the proper logical associations in an analysis module between the communication node, its location, and the RFID tag located on the communication node. This allows the identifier for the communication node 100 to be changed at the time of configuration or provisioning.

In another aspect, the RFID reader 120 can read RFID tags that are attached to other objects that pass in range or proximity to the RFID reader 120 such that the RFID tags can be read. Thus, if personnel are outfitted with RFID tags on their clothing, protective gear, etc., the RFID reader 120 can detect those RFID tags and include the tag IDs of detected tags within the transmissions from the communication node 100.

It should be appreciated that the communication node 100 can be located at predetermined locations within an underground environment. As such, the location of the communication node 100 is known. When the communication node 100 transmits from within the underground environment, the location from which any transmissions from the communication node 100 also is known. Accordingly, any RFID tags detected by the RFID reader 120 can be determined to be proximate, or within a known distance to the communication node 100 so as to be read, at least at the time the transmission from the communication node 100 was sent. It should be appreciated that the communication node 100 can include an internal clock which may or may not be synchronized with other nodes of the wireless network. In any case, any transmission originating from the communication node 100 can include timestamp information indicating a time and/or a date.

Figure 2:
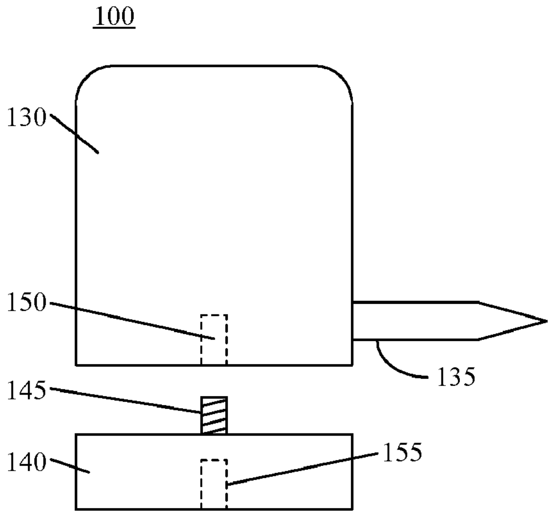
FIG. 2 is a block diagram illustrating another view of the communication node of FIG. 1 in accordance with another embodiment of the present invention.

FIG. 2 is a block diagram illustrating another view of the communication node 100 of FIG. 1. FIG. 2 illustrates the exterior portion of the communication node 100. As shown, the communication node 100 can be enclosed within a protective case 130. The case 130 can be cylindrical, though any suitable shape can be used. The case 130 can be fabricated from any of a variety of different materials. Preferably, the material can be strong, lightweight, and resilient to environmental conditions of the underground environment. For example, the case can be water-proof to protect the internal components from environmental hazards. Potential materials for use in constructing the case 130 can include, but are not limited to, Lexan or other similar material, composite materials including nano-molecular composite substrates composited with another material, e.g., aluminum, selected alloys, etc. The materials specified herein are not intended to serve as an exhaustive listing, but rather as illustrations of one or more materials that can be used.

A member 135 can extend outward from the case 130 as shown. In one embodiment, the member 135 can be a spike or a barbed spike. In this configuration, the communication node 100 can be attached to the wall, ceiling, or floor of the underground environment. In another embodiment, the member 135 can be detachable from the communication node 100, thereby allowing the member 135 to be driven into the underground environment. Once the member 135 is securely mounted in the underground environment, the communication node 100 can be attached to the member 135.

In one embodiment, one or more peripheral devices, such as peripheral device 140, can be attached to the communication node 100. The peripheral device 140 can be attached to the communication node 100 via a threaded, socket-type bus. That is, the peripheral device 140 can include a threaded member 145 which can be inserted into a receptacle 150 of the communication node 100. The peripheral device 140 and the communication node 100 can be physically secured to one another by the threaded member 145 and complementary receptacle 150.

The member 145 and the receptacle 150 not only allow the peripheral device 140 to be structurally connected to the communication node 100, but also communicatively link the communication node 100 and the peripheral device 140 such that any data generated by the peripheral device 140 can be provided to the mote and transmitted over the wireless network. Though only one peripheral device 140 is shown, it should be appreciated that the peripheral device 140 further can include a receptacle 155 to facilitate the inclusion of an additional peripheral device which can be attached to peripheral device 140. Additional peripheral devices can be chained together in manner shown.

It should be appreciated that the threaded, socket-type bus described with reference to FIG. 2 is but one variety of communication bus capable of physically connecting the peripheral device 140 to the communication node 100. Any of a variety of different connectors capable of providing structural support for the attachment of a peripheral device to the communication node 100 and a communication link can be used. For example, various military or aviation style connectors can be employed.

The peripheral device 140 can be any of a variety of sensors. In one embodiment, the peripheral device 140 can be a sensor that is capable of detecting one or more gases within the underground environment. Other varieties of sensors can include, but are not limited to, radio activity sensors, radon sensors, biological agent sensors such as arrays or microarrays (e.g., for detecting bacteria, viruses, molds, etc.), sensors capable of detecting selected fluids including petroleum based agents, lead, asbestos, coal dust, etc., and/or sensors that can receive vital sign information transmitted from one or more devices worn by personnel working within the underground environment.

Figure 3:
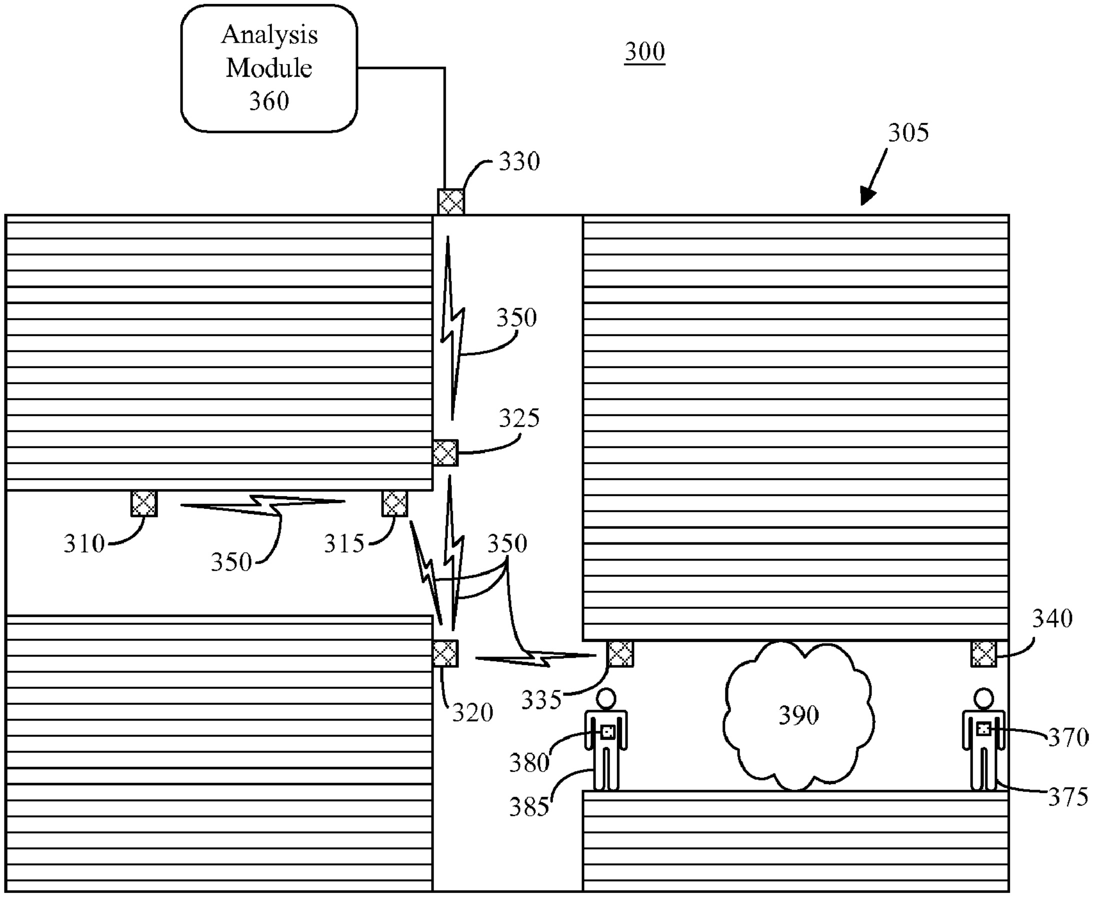
FIG. 3 is a block diagram illustrating a system in accordance with another embodiment of the present invention.

FIG. 3 is a block diagram illustrating a system 300 in accordance with another embodiment of the present invention. The system 300 can include a plurality of communication nodes 310, 315, 320, 325, 330, 335, and 340, and an analysis module 360. The communication nodes 310-340 can be implemented as discussed with reference to FIGS. 1 and/or 2. As shown, the communication nodes 310-340 can form a self-organized wireless network denoted as a series of wireless communication links 350.

The communication nodes 310-340, under normal conditions, can transmit data which propagates throughout the wireless network and, ultimately, to the communication node 330. The communication node 330 can be connected to the analysis module 360. It should be appreciated that the communication node 330 and the analysis module 360 can be communicatively linked directly or through another network, whether a wired network such as the Internet, the Public Switched Telephone Network (PSTN), a LAN, WAN, or another wireless network wherein the analysis module 360 includes a suitable wireless access point.

The analysis module 360 can record data received from the various communication nodes 310-340. Each of the transmissions from the communication nodes 310-340 can specify timestamp information, data from one or more sensors, identified RFID tags, whether the RFID tags are associated with the communication node sending the transmission or with personnel that are within range of the RFID reader of the communication node.

The analysis module 360 can be implemented as an information processing system, such as a computer, a server, etc., that is programmed with suitable operating and analysis software. The analysis module 360 can be programmed with a list of communication nodes in the system 300, a location for each communication node, a list of personnel, and an associated tag ID for each person.

The analysis module 360 can statistically process data received from the various communication nodes 310-340 and identify patterns or trends in the data that are indicative of a hazardous condition. For example, accelerometer data from the communication nodes 310-340 can be analyzed over a given time period to detect indicators in the acceleration data that have been determined or associated with a hazardous condition. One example of an indicator can include a trend of disturbances or tremors having increasing magnitude over a period of time. If such disturbances are below a threshold, such disturbances can be indicative of a larger event occurring at some time in the future. Another example of an indicator can simply be the detection of any tremor or disturbance. Depending upon the particular sensors included in the communication nodes 310-340, other indicators can include, but are not limited to, the presence of a particular gas or substance, radio activity, biological agents, liquids, other fluids, fumes, etc., or the presence of any such indicators in at least a minimum quantity within the underground environment.

In one embodiment, the analysis module 360 can determine that there is high likelihood of a particular hazardous condition occurring at some time in the future, for example, within a specified time period extending into the future. The analysis module 360 can provide a warning or notification. In another embodiment, the analysis module 360 can communicate the warning to the communication nodes 310-340 which can provide a visual or audible warning signal notifying personnel to exit the underground environment or selected areas of the underground environment.

In another embodiment, the analysis module 360 can determine that a hazardous condition has likely occurred. The analysis module can provide a warning as discussed. Further, the analysis module 360 can determine, or estimate, a location of the hazardous condition that has occurred. For example, if a collapse occurs within a tunnel, the transmissions between selected ones of the communication nodes 310-340 will be interrupted providing an indication that a hazardous condition has occurred.

As shown, due to some event occurring within the underground environment, a tunnel has become impassable due to a blockage 390. The communication node 335 is the nearest communication node to the blockage 390 that is still able to communicate with the communication nodes 310-330, and thus send data to the analysis module 360. Communication node 340, being located on the other side of the blockage 390 than communication node 335 is isolated and unable to communicate with the communication nodes 310-335. The analysis module 360 can determine that no data is being received from the communication node 340. If such a condition exists, for example, for a predetermined amount of time, the analysis module can determine that a hazardous condition likely has occurred.

Accordingly, the analysis module 360 can identify the communication nodes 310-340 from which data is being received and those from which data is not being received and, based upon that data, estimate the likely location of the hazardous condition, e.g., blockage 390. As the analysis module 360 continues to receive data from communication node 335, but not from communication node 340, the analysis module 360 can determine that the likely location of the hazardous condition, i.e., blockage 390, is between communication node 335 and communication node 340.

As noted, each communication node 310-340 can detect RFID tags, such as RFID tag 370 on person 375 and RFID tag 380 on person 385. As each communication node 310-340 further can transmit the tag ID of detected RFID tags, the analysis module 360 can monitor the location of personnel 385 and 375. For example, the analysis module 360 can determine that communication node 335 is detecting the RFID tag 380 of person 385. The analysis module 360 can determine that person 385 is likely on a side of the blockage 390 that may be reachable. Other information can be ascertained if the RFID tag 380 is detected by other communication nodes, e.g., that person 385 is in motion.

By the same token, if the analysis module 360 has not received data indicating the detection of RFID tag 370 associated with person 375, the analysis module 360 can determine that person 375 is unaccounted for and possibly located beyond the blockage 390. Such can be the case particularly if more recent data showing that the person 375 was identified as being proximate to another communication node such as communication node 330 near an exit is not available. While the communication node 340 may detect the RFID tag 370, transmissions from the communication node 340 are unable to pass the blockage 390 to propagate to the analysis module 360.

As noted, personnel, such as person 375 and 380, further can wear vital sign detection equipment that is capable of sensing biological conditions such as hear rate, or the like. The detection equipment can transmit the biological information for personnel to the communication nodes, for example, to a peripheral device attached to the communication nodes as described herein. Accordingly, any biological information received by a communication node can be propagated throughout the wireless network to the analysis module 360 for analysis and evaluation of the condition of the personnel.

In another embodiment of the present invention, if more than one path exists to reach the exit of the underground environment, and thus, communication node 330 and the analysis module 360, the size of the hazardous condition may be determined according to the number communication nodes not transmitting and the locations of such communication nodes. For example, if one or more communication nodes are disposed between the communication node 335 and the communication node 340, and the communication node 340 is able to transmit to one or more other communication nodes located to the right (not shown), which can propagate a transmission out to communication node 330 and the analysis module 360, the size of the blockage 390 can be estimated according to the communication nodes that can and cannot transmit data. For instance, if the analysis module 360 does not receive data from three consecutive communication nodes, the size of the hazardous condition can be estimated according to the distances between each consecutive communication node from which data is not received.

Figure 4:
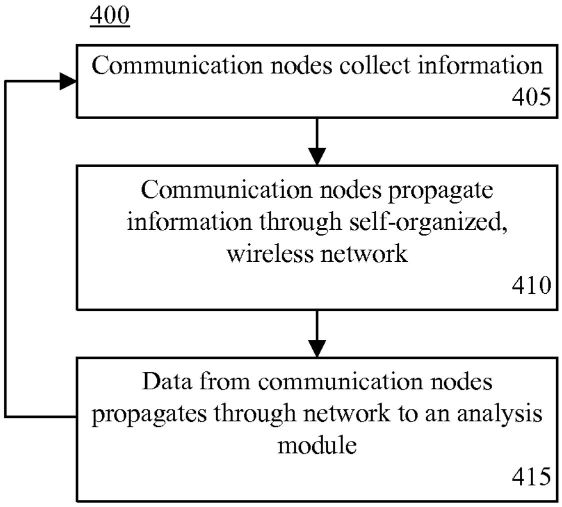
FIG. 4 is a flow chart illustrating a method in accordance with another embodiment of the present invention.

FIG. 4 is a flow chart illustrating a method 400 in accordance with another embodiment of the present invention. The method 400 can be performed by a system such as the system illustrated with reference to FIG. 3. Accordingly, the method 400 can begin in step 405 where the various communication nodes within of the system collect information. As noted, the communication nodes can collect information including, but not limited to, acceleration information, tag IDs corresponding to detected RFID tags, information indicating detected chemicals or gases, etc. The information collected can be transmitted and propagated through the self-organized wireless network in step 410. In step 415, the data from the communication nodes reaches the analysis module within which the data can be stored.

Figure 5:
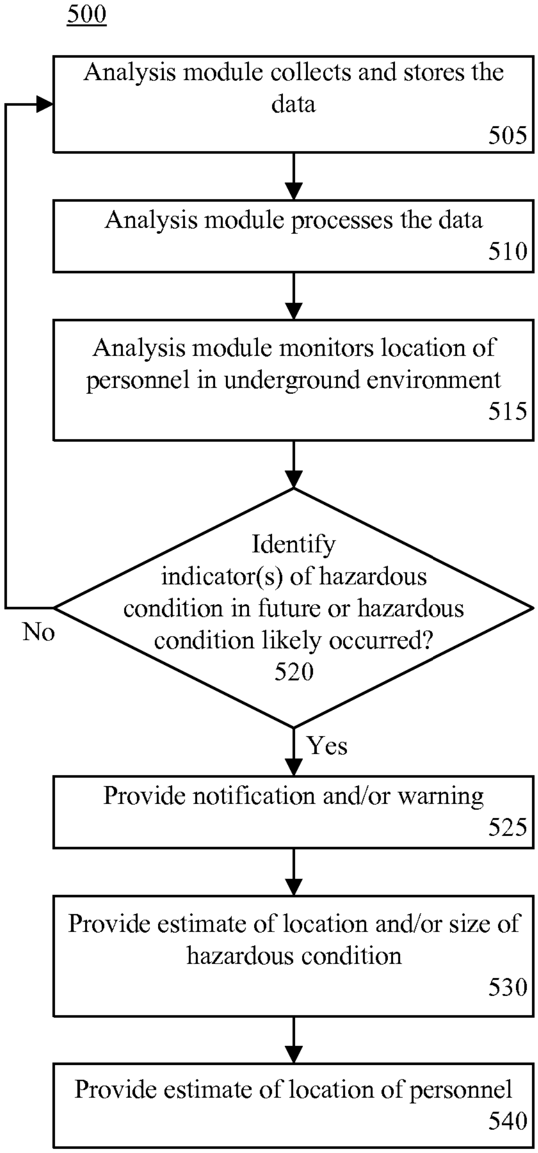
FIG. 5 is a flow chart illustrating a method in accordance with another embodiment of the present invention.

FIG. 5 is a flow chart illustrating a method 500 in accordance with another embodiment of the present invention. The method 500 can be implemented using the system of FIG. 3. The method 500 further can be performed concurrently with the method of FIG. 4. The method 500 illustrates one embodiment of a process that can be implemented by the analysis module. In any case, the method 500 can begin in step 505 where the analysis module collects and stores information that is received from the communication nodes of the system. The data can be stored and organized according to a variety of different parameters. For example, any data received from a communication node can be stored and associated with timestamp information as well as an indication of the communication node from which such data, including sensor readings, was taken.

In step 510, the analysis module can process the data. The analysis module can perform various statistical, stochastic, and/or chaos analysis techniques upon the data. In step 515, the server can monitor the location(s) of any personnel located within the underground environment through the detection of the RFID tags associated with such persons. In step 520, the analysis module, through processing the data received from the communication nodes, can determine whether any indicators that hazardous conditions are likely to occur or have likely occurred are present in the data. If one or more indications are determined, the method can proceed to step 525. If not, the method can loop back to step 505 to continue processing.

In step 525, the analysis module can provide a notification or warning that a hazardous condition is likely to occur within a given time period in the future or that a hazardous condition likely has occurred. In step 530, information regarding the hazardous condition can be provided. If the hazardous condition is expected in the future, the type of hazardous condition expected can be indicated, the indicators found in the data can be provided, the raw data, as well as a prediction of where the hazardous condition is likely to occur can be provided. If the analysis module determines that the hazardous condition likely has occurred, the analysis module can provide information regarding the hazardous condition such as an estimate of the location of the hazardous condition, an estimate of the size of the hazardous condition, etc.

In step 540, the analysis module also can provide an estimate of the location of personnel that are registered with the system. In one embodiment, for example, the analysis module can specify the location at which each person was last detected as well as the timestamp information corresponding to that detection.

The embodiments disclosed herein are directed to predicting and detecting the occurrence of hazardous conditions in an underground environment. Data can be collected from a plurality of communication nodes that are distributed throughout the underground environment. This data can be propagated through a wireless network formed of the communication nodes and provided to an analysis node. The analysis node can analyze the data to perform functions such as provide advance notice of expected hazardous conditions or events, determine when such events have occurred, as well as track the location of personnel within the underground environment.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of detecting hazardous conditions within an underground environment comprising:

obtaining acceleration information via an accelerator included in each of a plurality of communication nodes, each of said communication nodes being positioned at known locations throughout the underground environment;

propagating the acceleration information among selected ones of the plurality of communication nodes to an analysis node;

identifying, from the acceleration information collected over a period of time, an indication of a seismic activity within the underground environment;

if a seismic activity is identified, providing a notification of a hazardous condition;

interrogating passive radio-frequency identification (RFID) tags associated with persons located within the underground environment at selected ones of the plurality of communication nodes and detecting selected ones of RFID tags that activate in consequence of the interrogation;

propagating RFID tag information specifying detected RFID tags among selected ones of the plurality of communication nodes to the analysis node;

indicating which persons have been detected by at least one of the communication nodes according to the RFID tag information;

including an RFID reader and an RFID tag within each of the plurality of communication nodes;

interrogating, via the RFID reader, the RFID tag disposed within that communication node;

receiving an identifier of the interrogated RFID tag within the communication node; and propagating the identifier of the communication node to the analysis node as a secondary means of identifying which of the plurality of communication nodes sent transmitted data.

2. The method of claim 1, wherein identifying an indication of a seismic activity further comprises indicating that a hazardous condition has occurred responsive to determining that data is not being received from at least one of the plurality of communication nodes.

3. The method of claim 1, further comprising:

determining that data is not being received from at least one communication node of the plurality of communication nodes;

providing a notification that a hazardous condition in the underground environment has occurred;

identifying a selected communication node from which data is received that is nearest to the communication node from which data is not being received; and determining that the hazardous condition is located between the selected communication node from which data is received and the communication node from which data is not received.

4. The method of claim 1, further comprising:

charging the RFID tag within the communication node via a current moving into or out of the accelerometer.

5. The method of claim 1, further comprising:

propagating information obtained from a peripheral device that is communicatively linked with a specific communication node to the analysis node.

6. A computer readable storage device encoded with instructions, which when executed by a computer, causes the computer to perform a method for detecting hazardous conditions within an underground environment, said method comprising:

obtaining acceleration information via an accelerator included in each of a plurality of communication nodes, each of said communication nodes being positioned at known locations throughout the underground environment;

propagating the acceleration information among selected ones of the plurality of communication nodes to an analysis node;

identifying, from the acceleration information collected over a period of time, an indication of a seismic activity within the underground environment;

if a seismic activity is identified, providing a notification of a hazardous condition;

interrogating passive radio-frequency identification (RFID) tags associated with persons located within the underground environment at selected ones of the plurality of communication nodes and detecting selected ones of RFID tags that activate in consequence of the interrogation;

propagating RFID tag information specifying detected RFID tags among selected ones of the plurality of communication nodes to the analysis node;

indicating which persons have been detected by at least one of the communication nodes according to the RFID tag information;

interrogating, via an RFID reader located within the communication node, an RFID tag disposed within that communication node;

receiving an identifier of the interrogated RFID tag within the communication node; and propagating the identifier of the communication node to the analysis node as a secondary means of identifying which of the plurality of communication nodes sent transmitted data.

7. The computer readable storage device of claim 6, wherein identifying an indication of a seismic activity further comprises indicating that a hazardous condition has occurred responsive to determining that data is not being received from at least one of the plurality of communication nodes.

8. The computer readable storage device of claim 6, further comprising:

determining that data is not being received from at least one communication node of the plurality of communication nodes;

providing a notification that a hazardous condition in the underground environment has occurred;

identifying a selected communication node from which data is received that is nearest to the communication node from which data is not being received; and determining that the hazardous condition is located between the selected communication node from which data is received and the communication node from which data is not received.

9. The computer readable storage device of claim 6, further comprising:

charging the RFID tag within the communication node via a current moving into or out of the accelerometer.

10. The computer readable storage device of claim 6, further comprising:

propagating information obtained from a peripheral device that is communicatively linked with a specific communication node to the analysis node.

11. A system for detecting hazardous conditions within an underground environment, said system comprising:

a plurality of communication nodes configured to form a self-organized wireless network, each of said plurality of communication nodes being positioned at known locations throughout the underground environment and each of said communication nodes including an accelerometer configured to provide acceleration information to be propagated throughout the wireless network, an RFID tag configured to provide an identifier, and a radio-frequency identification (RFID) reader configured to interrogate passive RFID tags associated with persons located within the underground environment and the RFID tag located within the communication node, said RFID reader being further configured to propagate the identifier as a secondary means of identifying the communication node; and an analysis node configured to collect and evaluate the acceleration information propagated throughout the wireless network over a period of time, and to identify an indication of a seismic activity within the underground environment, said analysis node being further configured to provide a notification of a hazardous condition in response to identifying a seismic activity, wherein said RFID reader is further configured to propagate RFID tag information to said analysis node, and said analysis node is further configured to indicate which person has been detected by at least one of the communication nodes according to the RFID tag information.

12. The system of claim 11, wherein said analysis node is further configured to indicate that a hazardous condition has occurred responsive to determining that data is not being received from at least one of the plurality of communication nodes.

13. The system of claim 11, wherein said analysis node is further configured to:

determine that data is not being received from at least one communication node of the plurality of communication nodes;

provide a notification that a hazardous condition in the underground environment has occurred;

identify a selected communication node from which data is received that is nearest to the communication node from which data is not being received; and determine that the hazardous condition is located between the selected communication node from which data is received and the communication node from which data is not received.

14. The system of claim 11, wherein each of the plurality of communication nodes includes a mote.

15. The system of claim 11, wherein a current moving into or out of the accelerometer is used to charge the RFID tag within the communication node.

16. The system of claim 11, wherein at least one selected communication node of the plurality of communication nodes comprises an expandable communication bus structure providing structural support for a peripheral device communicatively linked with the communication node such that information collected by the peripheral device is propagated through the wireless network.

* * * * *